US007953653B2

(12) United States Patent
Siggers et al.

(10) Patent No.: US 7,953,653 B2
(45) Date of Patent: May 31, 2011

(54) SYSTEM AND METHOD FOR COMBINED RECONCILIATION OF CO-BRANDED CARD PROMOTION AND SETTLEMENT OF PRIVATE LABEL CARD ACCOUNTS

(75) Inventors: Kent Siggers, Wilmington, DE (US); Tracy Pletz, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 299 days.

(21) Appl. No.: 11/749,213

(22) Filed: May 16, 2007

(65) Prior Publication Data

US 2008/0288396 A1 Nov. 20, 2008

(51) Int. Cl.
*G06Q 40/00* (2006.01)

(52) U.S. Cl. .......................................................... 705/35

(58) Field of Classification Search .................... 705/35, 705/38, 39

See application file for complete search history.

(56) References Cited

U.S. PATENT DOCUMENTS 5,774,882 A * 6/1998 Keen et al. ...................... 705/38
6,490,568 B1 * 12/2002 O'Mara et al. .................. 705/39
6,505,095 B1 1/2003 Kolls
6,999,943 B1 * 2/2006 Johnson et al. ................. 705/39
7,069,244 B2 6/2006 Strayer et al.
7,243,839 B2 7/2007 Beck et al.
7,401,731 B1 7/2008 Pletz et al.
7,506,804 B2 3/2009 Zajkowski et al.
7,580,857 B2 8/2009 VanFleet et al.
2001/0034682 A1 10/2001 Knight et al.
2001/0034720 A1 10/2001 Armes
2002/0077978 A1 6/2002 O'Leary et al.
2002/0156723 A1 10/2002 Lilly et al.
2003/0144935 A1 7/2003 Sobek
2003/0171992 A1 9/2003 Blagg et al.

(Continued)

OTHER PUBLICATIONS

Cynthia Ramsaran.. "Co-Branded Cards Take Flight." Bank Systems & Technology May 1, 2005: 52(1 page).*

(Continued)

*Primary Examiner* — Elda Milef
(74) *Attorney, Agent, or Firm* — Hunton & Williams LLP

(57) ABSTRACT

A system and method for combined reconciliation of co-branded card promotion and settlement of private label card accounts are disclosed. According to one embodiment, the method may include (1) establishing a first relationship with a merchant for promotion of a credit card, the first relationship including at least one merchant compensation term; (2) establishing a second relationship with the merchant for the administration of the merchant's private label credit card transactions, the second relationship including at least one issuer compensation term; (3) receiving a first financial information related to the first relationship; (4) receiving a second financial information related to the second relationship; and (5) determining an account balance for the merchant based on at least one of the first information, the second information, the at least one merchant compensation term, and the at least one issuer compensation term. According to another embodiment, the system may include a server in communication with an issuer, a merchant and a bank card network. The server may receive a first financial information related the merchant's promotion of a credit card and a second financial information related to the merchant's private label credit card transactions. The system may further include a database that stores merchant compensation terms and issuer compensation terms. The system may also include a processor that determines an account balance for the merchant based on the first information, the second information, the at least one merchant compensation term, and/or the at least one issuer compensation term.

START
Establish relationship for co-branded credit card promotion account (310)
Establish relationship for private label credit card account (320)
Transfer information for co-brand and private label account to issuer (330)
Apply terms of relationships to information (340)
Reconcile and settle accounts in a single transaction (350)
STOP

46 Claims, 3 Drawing Sheets

U.S. PATENT DOCUMENTS

2003/0182247 A1* 9/2003 Mobed et al. .................. 705/78
2004/0010462 A1 1/2004 Moon et al.
2004/0088238 A1* 5/2004 Gilson et al. .................. 705/35
2004/0128195 A1 7/2004 Sorem
2005/0021363 A1 1/2005 Stimson et al.
2005/0077349 A1 4/2005 Bonalle et al.
2005/0199705 A1 9/2005 Beck et al.
2005/0240477 A1 10/2005 Friday et al.
2006/0026073 A1 2/2006 Kenny, Jr. et al.
2006/0095350 A1 5/2006 Hall et al.
2006/0116955 A1* 6/2006 Strayer et al. .................. 705/39
2007/0038515 A1* 2/2007 Postrel .......................... 705/14
2007/0226097 A1* 9/2007 Keechle ......................... 705/35
2008/0005018 A1* 1/2008 Powell .......................... 705/39
2008/0215470 A1* 9/2008 Sengupta et al. .............. 705/35
2008/0277465 A1 11/2008 Pletz et al.
2009/0171778 A1 7/2009 Powell

OTHER PUBLICATIONS

Davis, Donald. "Merchants Unbound". Card Technology. Jun. 2004; 9, 7 p. 36 (8 pages).*

Rolfe, Richard. "Europe's Cobranding Boom". Credit Card Management. Jan. 2003; 15, 11 p. 16 (4 pages).*

Kiley, Kathleen. "Branded!" Catalog Age; Jun. 1996; 13, 6 p. 77(4 pages).*

RF-Based Contactless Payment: A More Convenient Way to Pay, VivoTech, White Paper-Version 2.0, 25 pages, Apr. 2004.

* cited by examiner

SYSTEM AND METHOD FOR COMBINED RECONCILIATION OF CO-BRANDED CARD PROMOTION AND SETTLEMENT OF PRIVATE LABEL CARD ACCOUNTS

BACKGROUND OF THE INVENTION

1. Field of the Invention

The present invention generally relates to co-branded and private label credit cards, and, more particularly, to a system and method for combined reconciliation of co-branded card promotion and settlement of private label card accounts.

2. Description of the Related Art

General purpose credit cards are cards that are issued to a cardholder by an issuer, typically a financial institution, and are part of a large financial network, such as a bank card network. Examples of bank card networks include the VisaNet™, MasterCard®, and American Express™ networks. Typically, a cardholder can use a general purpose credit card with any merchant that participates in a particular bank card network. Thus, the card is general purpose in that it is generally accepted by merchants that are members of the network, as opposed to a card that is limited in purpose insofar as it can be used only with particular merchants.

One type of general purpose credit card is a co-branded card. Co-branded cards are co-sponsored by two companies and have benefits and rewards designed specifically for their joint customers. Typically, co-branded cards are sponsored by both a financial institution and a merchant, or other business partner, and include the financial institution's name and/or logo and, often more prominently, the merchant's brand or logo.

Private label credit cards, on the other hand, are cards that are issued by an issuer to a cardholder, typically with only the merchant's brand or logo. Unlike general purpose credit cards, however, private label credit cards are usually not part of a bank card network. Instead, private label credit cards typically use the issuer's transaction network. Thus, private label cards are generally for use only with the merchant whose brand appears on the card.

Referring to FIG. 1, a block diagram of a general purpose credit card and private label credit card processing system is provided. The system includes merchant 10, acquirer 130, card issuer 160, and cardholder 180.

Issuer 160 extends credit to cardholder 180 in the form of credit cards and maintains an account for cardholder 180. Issuer may issue both general purpose credit cards and private label credit cards to cardholder 180, and bills cardholder 180 for purchases against cardholder 180's account(s).

In the context of general purpose credit cards, acquirer 130 contracts with merchant 110 to process credit card transactions conducted by that merchant. With private label credit cards, however, issuer 160, which may also function as acquirer 130, contracts with merchant 110 to administer merchant 110's private label credit card transactions.

When cardholder 180 presents its general purpose credit card to make a purchase, the transaction is processed by acquirer 130 through bank card network 140. Cardholder 180's card is swiped, and merchant 110 receives an authorization from issuer 160, indicating that the card number and transaction amount are approved. At this time, however, funds are not transferred among the participants, though a hold is typically placed on those funds.

When cardholder 180 presents its private label credit card to make a purchase, however, the transaction is processed by issuer 160 through issuers transaction network 150. Merchant 110 receives authorization for the purchase from issuer 160. Similarly, funds are not transferred to merchant 110 at this time, but the funds may be placed on hold.

After the transaction is authorized, merchant 110 stores the transaction with other transactions in a "batch." A batch may simply be an electronic file that represents information regarding the transactions processed by the merchant, including, for example, credit card numbers, authorization codes, and purchase amounts. This is commonly in the form of an electronic file.

For general purpose credit card transactions, merchant 110 periodically sends the batch to its acquirer 130 to receive payment, i.e., to initiate settlement. Typically, this occurs on a daily basis at the end of the business day. After receiving the batch, acquirer 130 sends the transactions in the batch through bank card network 140, which debits issuer 160 for payment and credits acquirer 130. In effect, issuer 160 pays acquirer 130 for the transactions of its cardholders 180. Once acquirer 130 has been paid, merchant 110 receives payment. The amount merchant 110 receives is equal to the transaction amount minus a so-called "discount rate," which is typically based on a percentage of the purchase amount. The majority of this fee, called the interchange fee, goes to issuer 160, but parts of this fee go to bank card network 140 and acquirer 130.

For private label credit card transactions, merchant 110 periodically sends a batch of private label transactions to issuer 160 to receive payment. Because issuer's transaction network 150 is used, issuer 160 typically does not charge an interchange fee for the transactions. In the industry, transactions that are processed through the issuer's own transaction network are known as "on us" transactions, as distinguished from those that are processed through one of the bank card networks, often referred to as "not on us" transactions. Issuers prefer "on us" transactions because they do not have to share the discount fee with bank card network 140 or possibly with acquirer 130 because an acquirer may not be necessary in the private label environment.

For both general purpose credit card and private label credit cards, issuer 160 may be paid by cardholder 180 after cardholder 180's statement is posted, and may also receive interest and other fees on any of cardholder 180's balances.

SUMMARY OF THE INVENTION

A system and method for combined reconciliation of co-branded card promotion and settlement of private label card accounts. According to one embodiment, a method for combined reconciliation of a credit card promotion relationship and settlement of a private label credit card relationship, may include the steps of (1) establishing a first relationship with a merchant for promotion of a credit card, the first relationship including at least one merchant compensation term; (2) establishing a second relationship with the merchant for the administration of the merchant's private label credit card transactions, the second relationship including at least one issuer compensation term; (3) receiving a first financial information related to the first relationship; (4) receiving a second financial information related to the second relationship; and (5) determining an account balance for the merchant based on at least one of the first information, the second information, the at least one merchant compensation term, and the at least one issuer compensation term. The credit card may be a co-branded credit card.

The first relationship may include an issuer-merchant relationship, and the second relationship may include an issuer-merchant relationship and/or an acquirer-merchant relationship.

The administration of the private label credit card transactions may include receiving applications for private label credit cards from applicants, issuing private label credit cards to approved applicants, authorizing purchases with the private label credit cards; compensating the merchant based on the authorized purchases, invoicing the cardholders for purchases made with the private label cards, and/or receiving payments from cardholders.

The merchant compensation terms and the issuer compensation terms may be modified.

The first financial information may be provided by the merchant, a bank card network, and/or the issuer. The first financial information may include an identification of a number of applications for the credit card submitted, a number of the applications for the credit card approved, a number of first uses of the credit card, a number of transactions conducted with the credit card, a dollar amount of the transactions conducted with the credit card, a number of rewards issued to the cardholders, and/or a value of the rewards issued to cardholders.

The second financial information is provided by the merchant, a merchant aggregator, and/or the issuer. The second financial information may include an identification of a number of applications for the private label credit card submitted, a number of the applications for the private label credit card approved, a number of first uses of the private label credit card, a number of transactions conducted with the private label credit card, and a dollar amount of the transactions conducted with the private label credit card. The second financial information may also include an identification of a number of purchases at standard terms and/or a number of purchases under non-standard terms.

The merchant may provide the first financial information and/or the second financial information periodically. The merchant may also provide the first financial information and the second financial information simultaneously.

The step of determining an account balance for the merchant based on the first and second information may be performed monthly, weekly, daily, bi-daily, and hourly.

According to another embodiment, a method for combined reconciliation of a credit card promotion relationship and settlement of a private label credit card relationship between an issuer and a merchant may include the steps of (1) establishing a first relationship with the issuer for promotion of a credit card, the first relationship including at least one merchant compensation term; (2) establishing a second relationship with the issuer for administration of the merchant's private label credit card transactions, the second relationship including at least one issuer compensation term; (3) providing a first financial information related to the first relationship to the issuer; (4) providing a second financial information related to the second relationship to the issuer; and (5) receiving an updated account balance from the issuer based on at least one of the first information, the second information, the at least one merchant compensation term, and the at least one issuer compensation term. The credit card may be a co-branded credit card.

The second relationship may include an issuer-merchant relationship and/or an acquirer-merchant relationship.

The administration of the private label credit card transactions may include receiving applications for private label credit cards from applicants, issuing private label credit cards to approved applicants, authorizing purchases with the private label credit cards; compensating the merchant based on the authorized purchases, invoicing the cardholders for purchases made with the private label cards, and/or receiving payments from cardholders.

The merchant compensation terms and the issuer compensation terms may be modified.

The first financial information may include an identification of a number of applications for the credit card submitted, a number of rewards issued to the cardholders, and/or a value of the rewards issued to cardholders.

The second financial information may include an identification of a number of applications for the credit card submitted, a number of transactions conducted with the credit card, and/or a dollar amount of the transactions conducted with the credit card. The second financial information may also include an identification of a number of purchases at standard terms and/or a number of purchases under non-standard terms.

The first financial information and/or the second financial information may be provided to the issuer periodically. The first financial information and the second financial information may be provided to the issuer simultaneously.

The updated account balance may be received monthly, weekly, daily, bi-daily, and hourly.

According to another embodiment of the present invention, a system for combined reconciliation of a credit card promotion relationship and settlement of a private label credit card relationship between an issuer and a merchant may include a server in communication with an issuer, a merchant and a bank card network. The server may receive a first financial information related the merchant's promotion of a credit card and a second financial information related to the merchant's private label credit card transactions. The system may further include a database that stores merchant compensation terms and issuer compensation terms. The system may also include a processor that determines an account balance for the merchant based on the first information, the second information, the at least one merchant compensation term, and/or the at least one issuer compensation term.

The credit card may be a co-branded credit card.

The first financial information may be provided by the merchant, a bank card network, and/or the issuer. The first financial information may include an identification of a number of applications for the credit card submitted, a number of the applications for the credit card approved, a number of first uses of the credit card, a number of transactions conducted with the credit card, a dollar amount of the transactions conducted with the credit card, a number of rewards issued to the cardholders, and a value of the rewards issued to cardholders.

The second financial information may be provided by the merchant, a merchant aggregator, and/or the issuer. The second financial information may include an identification of a number of applications for the credit card submitted, a number of the applications for the credit card approved, a number of first uses of the credit card, a number of transactions conducted with the credit card, and a dollar amount of the transactions conducted with the credit card. The second financial information may also include an identification of a number of purchases at standard terms and/or a number of purchases under non-standard terms.

The merchant may provide the first financial information and/or the second financial information to the issue periodically. The merchant may also provide the first financial information and the second financial information to the issuer simultaneously.

The account balance for the merchant may be determined monthly, weekly, daily, bi-daily, or hourly.

According to another embodiment, a method for a merchant offering a private label card to a cardholder includes the steps of (1) receiving credit card information from a cardholder for a transaction; (2) determining if the cardholder has been issued a private label credit card for the merchant; (3) offering the cardholder an opportunity to apply for the private label credit card for the merchant in response to a determination that the cardholder has not been issued a private label credit card for the merchant. The credit card information may be received at a point of sale.

The method may also include the steps of receiving an application for the private label card from the cardholder; determining if the cardholder should be issued the private label card for the merchant; creating an private label account for the cardholder in response to a determination that cardholder should be issued the private label card for the merchant; and completing the transaction with the private account.

The method may further include the step of offering the cardholder an opportunity to complete the transaction on the cardholders' private label card in response to a determination that the cardholder has been issued the private label card for the merchant. The transaction may be completed with the cardholder's private label card.

It is a technical advantage of the present invention that a system and method for combined reconciliation of co-branded card promotion and settlement of private label card accounts is disclosed. It is another technical advantage of the present invention that an account balance for a merchant may be determined based on a first relationship with a merchant for promotion of a credit card, at least one merchant compensation term, a second relationship with the merchant for the administration of the merchant's private label credit card transactions, and at least one issuer compensation term. It is still another technical advantage of the present invention that the account balance may be determined monthly, weekly, daily, bi-daily, and hourly.

BRIEF DESCRIPTION OF THE DRAWINGS

For a more complete understanding of the present invention, the objects and advantages thereof reference is now made to the following descriptions taken in connection with the accompanying drawings in which.

DETAILED DESCRIPTION OF PREFERRED EMBODIMENTS

Figure 2:
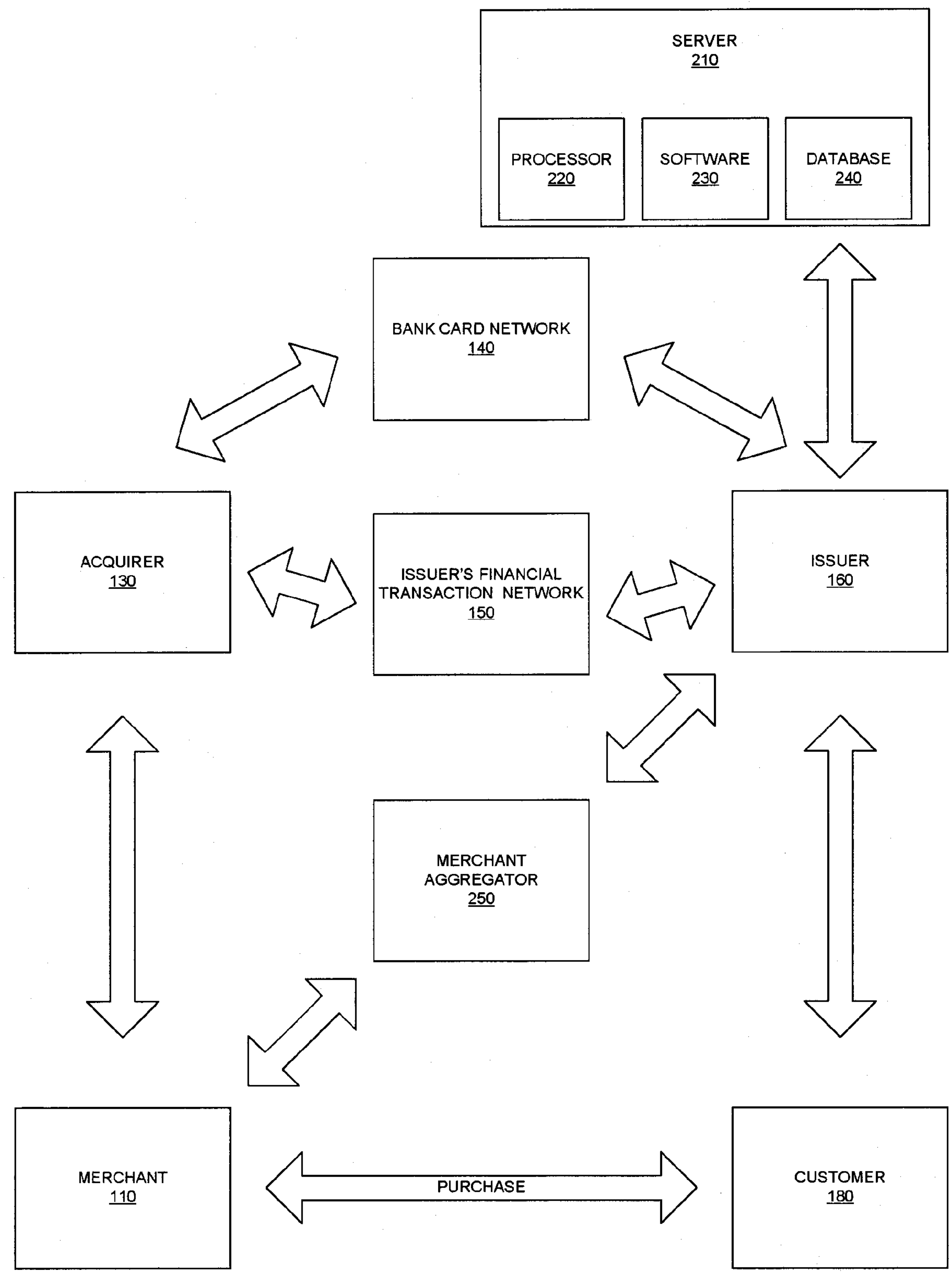
FIG. 2 is a block diagram of a credit card processing system according to an embodiment of the present invention.
Figure 3:
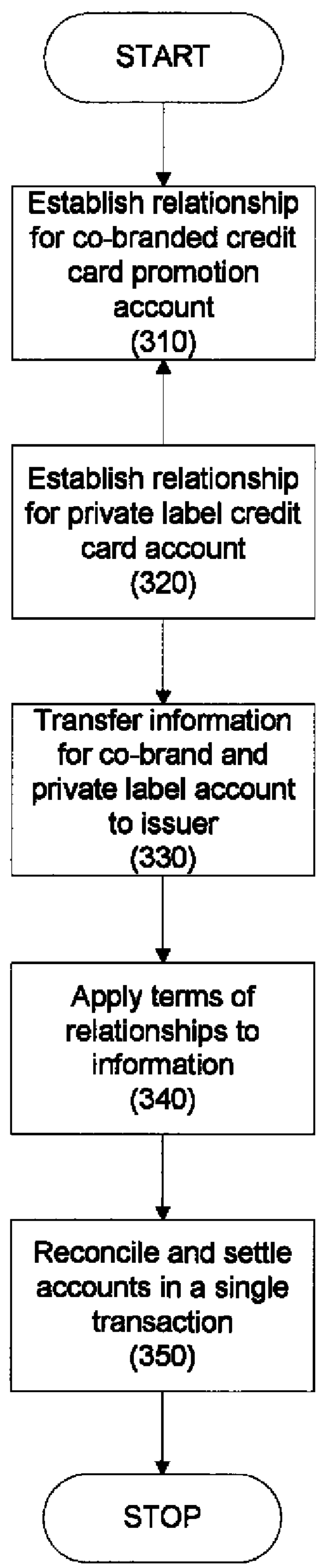
FIG. 3 is a flowchart depicting a method according to one embodiment of the present invention.

Several embodiments of the present invention and their advantages may be understood by referring to FIGS. 2-3, wherein like reference numerals refer to like elements.

The present invention is directed to a system and method for combined reconciliation of co-branded card promotion accounts and settlement of private label card accounts. In general, a co-branded card promotion account is not the same as a credit card account maintained between a merchant and an acquirer or between an issuer and a cardholder. Instead, the promotion account is based on the merchant's promotion of the co-branded card (e.g., number of accounts applied for, opened, and/or used), rewards issued to customers, and interchange fees received based on cardholders' use of that card.

Typically, a merchant will promote the use of its co-branded card by encouraging customers to apply for the card by filling out an application (e.g., paper application, on-line application, phone application, etc.). In one embodiment, each co-brand credit card application may include an identifier that identifies the source of the credit card application. For example, the identifier may identify the particular store, department, employee, etc. that promoted the application. The identifier may be used in reconciliation of the co-branded card promotion account in order to credit the source of the application.

Reconciliation of a co-branded card promotion account can be contrasted with the settlement of a private label card account. In reconciling a co-branded card promotion account, the issuer compensates the merchant for use of that merchant's brand and for the merchant's efforts at promoting the co-branded card. For example, the issuer may pay the co-brand merchant a fee for each new co-brand credit card account applied for and/or opened, for first uses of co-branded cards, and/or for transactions processed using the co-branded cards. The merchant may also be compensated, in whole or in part, for rewards that are issued to cardholders.

Settlement of a private label card account, on the other hand, involves the merchant compensating the issuer for administering the private label card transactions for that merchant. In one embodiment, it also involves the issuer paying the merchant for purchases made by private label credit card cardholders, i.e., private label account settlement. The amounts transferred from the issuer to the merchant in private label settlement may be adjusted by a private label transaction fee the merchant must pay to the private label issuer (e.g., the transaction fee might be charged on a per-transaction basis, based on volume of funds, based on volume of transactions, etc.). This is usually referred to as the "discount fee."

According to one embodiment of the present invention, reconciliation of the co-branded card promotion account and settlement of the private label card account are combined into one settlement infrastructure and/or transaction. This combination provides the issuer with flexibility in establishing relationships with merchants with whom the issuer has both relationships. For example, the issuer is able to effectively share the revenue that is generated by, for example, interchange fees based on use of the co-branded card with the merchant in order to promote the merchant's private label card system.

Figure 1:
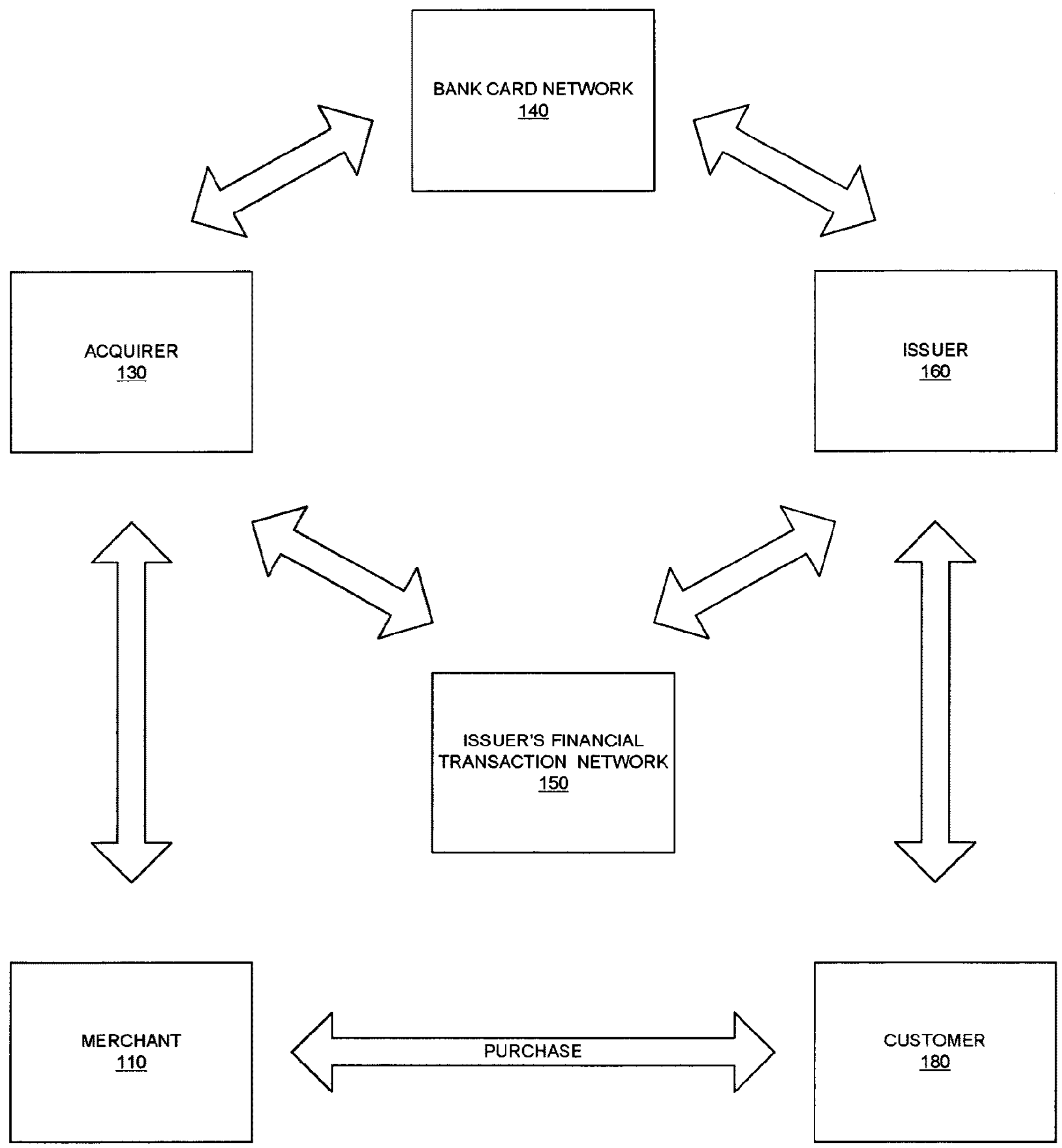
FIG. 1 is a block diagram of a credit card processing system according to a typical prior art approach.

Referring to FIG. 2, a block diagram of a system for combined reconciliation of co-branded card promotion accounts and settlement of private label card accounts is provided. Like numbers are used to refer to like numbers in FIG. 1.

According to one embodiment of the present invention, in FIG. 2, issuer 160 is provided with server 210. Server 210 includes processor 220, database 240, and software 230. Processor 320 may execute software 330 in order to process information to reconcile the co-branded card promotion account and settle the private label card account. Database 240 may used to store electronic files, such as the relationship files associated with the co-branded card promotion relationship and the private label card relationship.

According to one embodiment, server 210 is further adapted to process private label authorization transaction requests made by merchant 110 at, for example, a point of sale (POS). Thus, in addition to the functionality described in the above paragraph, server 210 may function as a private label card processor to approve and/or deny transactions.

The person of ordinary skill will readily appreciate that the elements in FIG. 2 are functional and designed to illustrate the system, and that they could easily be combined into higher level elements or further subdivided. Just as one example, server 210 could actually comprise several servers that are collocated or that are in different locations. Similarly, database 240 could actually comprise several different databases at different locations.

The person of ordinary skill in this field will also appreciate that the interface (diagonal) in FIG. 2 between merchant 110 and issuer 160 provides an operative connection to enable the private label transaction processing, co-brand promotion and private label settlement, and other transactions between those parties. The person of ordinary skill will further recognize that such interface enables transactions to be processed outside of a standard bank card network in whole or in part. For example, assuming the cardholder's card is a co-brand VISA® card issued by JPMorgan Chase Bank, the authorization request submitted by merchant 110 could be submitted by the merchant 110 and processed by the issuer 160-acquirer 130 while bypassing the VISA® bank card network in part or whole. For example, the authorization transaction could be submitted in an operationally direct manner from the merchant 110 to issuer 160 without invoking the routing and BIN (bank identification number) processing functionality of the bank card network.

In one embodiment, merchant aggregator 250 may interface between merchant 110 and issuer 160. Merchant aggregator 250 may collect information from merchant 110 and provide that information to issuer 160.

Referring to FIG. 3, a flowchart depicting a method for combined reconciliation of a co-branded card promotion account and a private label account is provided. In step 310, an issuer and a merchant establish a relationship for the promotion of a co-branded card. In one embodiment, this involves establishing the terms of the relationship. The terms may include, for example, the amount that the issuer will pay the merchant for each co-branded card application that is received by the issuer; the amount that the issuer will pay the merchant for each co-branded card application that is approved; the amount that the issuer will pay the merchant for use of co-branded cards; and/or the amount that the issuer will pay the merchant for rewards that are issued to the cardholders, etc. Other terms associated with use of the co-branded cards may also be included as necessary and/or desired.

In one embodiment, the terms of the co-branded card promotion relationship are stored as an electronic file. This electronic file may be stored by the issuer, and used in to order to reconcile the merchant's co-branded card account.

In step 320, the issuer and the merchant establish a relationship for the administration of a private label card transactions. This may involve establishing the terms of the relationship between the merchant and the issuer, including revenue sharing between the issuer and the merchant based on the existence of both the co-branded card and private label relationships. The terms of the private label relationship may be related to the terms of the co-branded card promotion relationship.

In one embodiment, the merchant may be offered incentives that are generally not offered to a merchant having only a private label account. For example, in one embodiment, the private label card transaction fee that the combined co-branded/private label merchant pays may be less than the private label transaction fee that is charged to a merchant that does not have both relationships. In another embodiment, the issuer may not charge the merchant a fee for transactions made under standard private label terms (i.e., standard interest rate and payment terms). For such transactions, the issuer would be relying on income based on interest payments from customers. However, for transactions made under non-standard, or promotional terms (i.e., no or low interest rate for a specified time), the issuer may charge the merchant a fee because it may be less likely that customer will make interest payments on such a transaction.

In another embodiment, the issuer may reward the merchant for the profitability of its private label account. For instance, a merchant may be rewarded based on the outstanding balances of the private label cardholders.

In one embodiment, as with the terms of the co-branded card promotion relationship, the terms of the private label relationship are stored as an electronic file. This electronic file may be stored by the issuer, and used in to order to settle the merchant's private label account.

The electronic files for the co-branded card promotion relationship and the private label relationship may be separate files, or they may be combined into a single file.

In one embodiment, the arrangement between the issuer and merchant may include setting up a single, combined merchant account for both reconciliation of the co-branded card promotion account and the settlement of the private label account. In another embodiment, the two accounts may remain separate, but are reconciled and settled together.

Periodically, in step 330, the co-branded card promotion account information and private label account information is transferred to the issuer, preferably electronically and preferably as a batch-type file. This information may be transmitted by the merchant together (e.g., batch), or it may be transmitted separately. In one embodiment, the information is transmitted on a daily basis. In other embodiments, the information may be transmitted more or less frequently as necessary and/or desired.

In one embodiment, information regarding one of the accounts may be transmitted more frequently than information for the other account. For example, private label account information may be transmitted hourly, while co-branded card promotion information may be transmitted less frequently, such as on a daily basis. In another embodiment, the private label account information is transmitted in the normal course of a merchant-issuer private label relationship (e.g., daily at the end of the day) with no additional transmissions. Other frequencies may be used as necessary and/or desired.

In another embodiment, information regarding these accounts may be provided from sources other than the merchant. For example, the issuer may receive information regarding purchases made with the co-branded cards from a bank card network. In one embodiment, the merchant may not have access to certain information regarding use of the co-branded card, and this information necessarily comes from another source, such as a bank card network.

In one embodiment, the information regarding the co-branded card promotion account received by the issuer may include, for the transaction period, an identification of the number of co-branded cards applied for and/or issued; the number of initial purchases made using co-branded cards; the volume and/or dollar amount of transactions made with co-branded cards; interchange fees received by the issuer; and/or any other information specific to the terms of the relationship between the merchant and the issuer that is used to determine the merchant's compensation for use of its brand. Other information regarding the co-branded card promotion account may be collected as necessary and desired.

Information regarding the private label card account may include, for the transaction period, an identification of the number of private label cards applied for and/or issued; the number of initial transactions made using private label cards; the volume and dollar amount of transactions made with private label cards; the volume and dollar amount of promotional and non-promotional transactions made with private label cards; and/or any other information specific to the terms of the relationship between the merchant and the issuer that is used to determine the issuer's compensation. Other information regarding the private label card account may be collected as necessary and desired.

In step 340, once the information is received by the issuer, the terms of the relationships may be applied to this information. In one embodiment, the application of the terms of the relationship to the co-branded card promotion account results in a credit to the merchant. With regard to the private label account, the merchant is typically debited a fee (discount fee) for the administration of the private label credit card transactions, but is credited an amount based on cardholder purchases using the private label credit cards.

In step 350, the accounts are reconciled and settled together. In one embodiment, the results of step 240 are combined to result in a single payment or debit to the merchant's account. The reconciliation and settlement may be effected electronically (e.g., by electronic funds transfer), or it may be effected manually (e.g., by check).

According to one embodiment, the combined reconciliation and settlement includes three components: (1) fees due to the merchant from the issuer based on the co-branded instrument, (2) fees due to the issuer from the merchant based on the private label instrument, and (3) transaction amounts (consumer purchases) due to the merchant from the issuer based on private label card purchase transactions. In this embodiment, a periodic (e.g., daily) net settlement for the benefit of the merchant occurs for the aggregate transactions amount (purchases) less the private label merchant transaction fees and adding the co-brand issuer fees.

For merchants having multiple stores, including, for example, stores in different regions, states, cities, etc., or for merchants having franchises, the combined reconciliation and settlement may be performed at different levels. For example, co-branded promotion information that is specific to the region, state, city, or store may be reconciled for that particular region, state, city or store along with the private label account information for that particular region, state, city or store.

In one embodiment, if the application for a co-branded credit card can be associated with a particular region, state, city or store, the bank card network information for that particular co-branded credit card may be part of the reconciliation for that region, state, city or store. In another embodiment, bank card network information for co-branded credit cards are reconciled at the merchant and/or partner level.

The frequency of reconciliation and settlement may vary as necessary and/or desired. The frequency of reconciliation and settlement is not required to be associated with the frequency that the issuer receives information regarding the co-branded card promotion account or the private label account. In one embodiment, the reconciliation and settlement may occur bi-weekly, weekly, daily, or even more frequently as necessary and desired. For example, toward the end of a month or during a holiday period, multiple reconciliations and settlements may be performed in a single day.

The ability to reconcile and settle accounts on a frequent basis, such as daily or even more frequently, allows the merchant to initiate promotions with its private label cards rapidly. This may be necessary in response to a competitor's promotion, in response to market conditions, in response to an unexpected product, etc. In one embodiment, the merchant's promotion (e.g., no or low payments for a predetermined time, low or no interest rate, additional rewards, etc.) may be implemented by, for example, by altering the terms of the relationship. In one embodiment, the electronic file for the co-branded card promotion relationship and/or the private label card relationship may be altered or updated to reflect the promotion. Thus, the updated relationship information may be applied in settlement shortly after the appropriate relationship files are updated.

In one embodiment, a merchant having a combined co-branded card and private label credit card relationship with an issuer may promote its private label cards at the point of sale. For example, when a cardholder uses a general purpose credit card, or a co-branded card that is not associated with the merchant, to make a purchase with that credit card, the point of sale equipment may determine whether the issuer is the issuer of the card, and, if so, whether the cardholder possesses a private label card for that merchant. This determination may involve retrieving bank information based on the BIN for the card. If the equipment determines that the cardholder does not possess a private label card for that merchant, it may offer a private label card at a promotional rate, such as a discount on the current purchase or low or no interest for a period of time.

If the point of sale equipment identifies that the cardholder does have a private label card with that merchant, it may offer the cardholder the opportunity to complete the purchase on the cardholder's private label card. This offer may include an incentive or promotion for the cardholder.

Hereinafter, general aspects of implementation of the systems and methods of the invention will be described.

As described above, FIGS. 2-3 show embodiments of the system of the invention. Further, FIGS. 2-3 show various processes of embodiments of the method of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portions Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for combined reconciliation of a credit card promotion relationship and settlement of a private label credit card relationship between an issuer and a merchant, comprising:

establishing a first relationship between the issuer and the merchant for promotion of a credit card, the first relationship including at least one merchant compensation term, the at least one merchant compensation term stored in an electronic file;

establishing a second relationship between the issuer and the merchant for the administration of the merchant's private label credit card transactions, the second relationship including at least one issuer compensation term, the at least one issuer compensation term stored in an electronic file;

receiving at least one electronic file containing a first financial information related to the first relationship;

receiving at least one electronic file containing a second financial information related to the second relationship; and using a computer processor, determining an account balance for the merchant based on the first information, the second information, the at least one merchant compensation term, and the at least one issuer compensation term.

2. The method of claim 1, wherein the credit card is a co-branded credit card.

3. The method of claim 1, wherein the first relationship comprises an issuer-merchant relationship.

4. The method of claim 1, wherein the second relationship comprises at least one of an issuer-merchant relationship and an acquirer-merchant relationship.

5. The method of claim 1, wherein the administration of the private label credit card transactions comprises at least one of receiving applications for private label credit cards from applicants, issuing private label credit cards to approved applicants, authorizing purchases with the private label credit cards; compensating the merchant based on the authorized purchases, invoicing the cardholders for purchases made with the private label cards, and receiving payments from cardholders.

6. The method of claim 1, further comprising:

modifying the at least one merchant compensation term stored in the merchant compensation term electronic file.

7. The method of claim 1, further comprising:

modifying the at least one issuer compensation term stored in the issuer compensation term electronic file.

8. The method of claim 1, wherein the first financial information is provided by the merchant.

9. The method of claim 1, wherein the first financial information is received from a bank card network.

10. The method of claim 1, wherein the first financial information includes an identification of at least one of a number of applications for the credit card submitted, a number of the applications for the credit card approved, a number of first uses of the credit card, a number of transactions conducted with the credit card, a dollar amount of the transactions conducted with the credit card, a number of rewards issued to the cardholders, and a value of the rewards issued to cardholders.

11. The method of claim 1, wherein the second financial information is provided by the merchant.

12. The method of claim 1, wherein the second financial information is received from a merchant.

13. The method of claim 1, wherein the second financial information includes an identification of at least one of a number of applications for the private label credit card submitted, a number of the applications for the private label credit card approved, a number of first uses of the private label credit card, a number of transactions conducted with the private label credit card, and a dollar amount of the transactions conducted with the private label credit card.

14. The method of claim 1, wherein the second financial information comprises at least one of an identification of a number of purchases at standard terms and a number of purchases under non-standard terms.

15. The method of claim 1, wherein the merchant provides at least one of the first financial information and the second financial information periodically.

16. The method of claim 1, wherein the merchant provides the first financial information and the second financial information simultaneously.

17. The method of claim 1, wherein the step of determining an account balance for the merchant based on the first and second information is performed at a period selected from the group consisting of monthly, weekly, daily, bi-daily, and hourly.

18. The method of claim 1, further comprising:

settling the merchant's account with the issuer based on the merchant's account balance.

19. A method for combined reconciliation of a credit card promotion relationship and settlement of a private label credit card relationship between an issuer and a merchant, comprising:

establishing a first relationship with the issuer for promotion of a credit card, the first relationship including at least one merchant compensation term;

using a computer processor, storing the at least one merchant compensation term in a merchant compensation term electronic file;

establishing a second relationship with the issuer for administration of the merchant's private label credit card transactions, the second relationship including at least one issuer compensation term;

using the computer processor, storing the at least one issuer compensation term in an issuer compensation term electronic file;

providing at least one electronic file containing a first financial information related to the first relationship to the issuer;

providing at least one electronic file containing a second financial information related to the second relationship to the issuer; and receiving, from the issuer, at least one electronic file containing an updated account balance for the merchant determined by the issuer using an issuer computer processor based on the first information, the second information, the at least one merchant compensation term, and the at least one issuer compensation term.

20. The method of claim 19, wherein the credit card is a co-branded credit card.

21. The method of claim 19, wherein the second relationship comprises at least one of an issuer-merchant relationship and an acquirer-merchant relationship.

22. The method of claim 19, wherein the administration of the private label credit card transactions comprises at least one of receiving applications for private label credit cards from applicants, issuing private label credit cards to approved applicants, authorizing purchases with the private label credit cards; compensating the merchant based on the authorized purchases, invoicing the cardholders for purchases made with the private label cards, and receiving payments from cardholders.

23. The method of claim 19, further comprising:

modifying the at least one merchant compensation term stored in the merchant compensation term electronic file.

24. The method of claim 19, further comprising:

modifying the at least one issuer compensation term stored in the issuer compensation term electronic file.

25. The method of claim 19, wherein the first financial information includes an identification of at least one of a number of applications for the credit card submitted, a number of rewards issued to the cardholders, and a value of the rewards issued to cardholders.

26. The method of claim 19, wherein the second financial information includes an identification of at least one of a number of applications for the credit card submitted, a number of transactions conducted with the credit card, and a dollar amount of the transactions conducted with the credit card.

27. The method of claim 19, wherein the second financial information comprises an identification of at least one of a number of purchases at standard terms, and a number of purchases under non-standard terms.

28. The method of claim 19, wherein at least one of the first financial information and the second financial information is provided to the issuer periodically.

29. The method of claim 19, wherein the first financial information and the second financial information is provided to the issuer simultaneously.

30. The method of claim 19, wherein the updated account balance is received at a period selected from the group consisting of monthly, weekly, daily, bi-daily, and hourly.

31. The method of claim 19, further comprising:

settling the merchant's account with the issuer based on the merchant's account balance.

32. A system for combined reconciliation of a credit card promotion relationship and settlement of a private label credit card relationship between an issuer and a merchant, comprising:

a server in communication with an issuer, a merchant and a bank card network, the server receiving a first financial information related to the merchant's promotion of a credit card and a second financial information related to the merchant's private label credit card transactions;

a database for storing at least one merchant compensation term and at least one issuer compensation term; and a processor for determining an account balance for the merchant based on the first information, the second information, the at least one merchant compensation term, and the at least one issuer compensation term.

33. The system of claim 32, wherein the credit card is a co-branded credit card.

34. The system of claim 32, wherein the first financial information is provided by the merchant.

35. The system of claim 32, wherein the first financial information is received from a bank card network.

36. The system of claim 32, wherein the first financial information includes an identification of at least one of a number of applications for the credit card submitted, a number of the applications for the credit card approved, a number of first uses of the credit card, a number of transactions conducted with the credit card, a dollar amount of the transactions conducted with the credit card, a number of rewards issued to the cardholders, and a value of the rewards issued to cardholders.

37. The system of claim 32, wherein the second financial information is provided by the merchant.

38. The system of claim 32, wherein the second financial information is received from a merchant.

39. The system of claim 32, wherein the second financial information includes at least one of a number of applications for the credit card submitted, a number of the applications for the credit card approved, a number of first uses of the credit card, a number of transactions conducted with the credit card, and a dollar amount of the transactions conducted with the credit card.

40. The system of claim 32, wherein the second financial information comprises a number of purchases at standard terms, and a number of purchases under non-standard terms.

41. The system of claim 32, wherein the merchant provides at least one of the first financial information and the second financial information to the issuer periodically.

42. The system of claim 32, wherein the merchant provides the first financial information and the second financial information to the issuer simultaneously.

43. The system of claim 32, wherein the account balance for the merchant is determined by a period selected from the group consisting of monthly, weekly, daily, bi-daily, and hourly.

44. A method for combined reconciliation of a co-branded credit card promotion relationship and settlement of a private label credit card relationship between an issuer and a merchant, comprising:

establishing a first relationship between the issuer and the merchant for promotion of the co-branded credit card, the first relationship including at least one merchant compensation term, the at least one merchant compensation term stored in an electronic file;

receiving applications for co-branded credit cards from co-branded credit card applicants;

issuing co-branded credit cards to approved co-branded credit card applicants resulting in co-branded credit card cardholders;

receiving a co-branded credit card purchase authorization request for a purchase with the co-branded credit card over a bank card network;

authorizing the co-branded credit card purchase authorization request over the bank card network;

receiving interchange fees for the purchase with the co-branded credit cards;

invoicing the co-branded credit card cardholder for the purchase made with the co-branded credit card;

receiving payments from the co-branded credit card cardholders;

establishing a second relationship between the issuer and the merchant for the administration of the merchant's private label credit card transactions, the second relationship including at least one issuer compensation term, the at least one issuer compensation term stored an electronic file;

receiving applications for private label credit cards from private label credit card applicants, issuing private label credit cards to approved private label credit card applicants resulting in private label credit card cardholders;

receiving a private label purchase authorization request for a purchase with the private label credit card over the issuer's financial network;

authorizing the private label purchase authorization request over the issuer's financial network;

invoicing the private label credit card cardholder for the purchase made with the private label card; and receiving payments from the private label credit card cardholder;

using a computer processor, determining an account balance for the merchant based on a number of applications for co-branded credit cards received, a number of co-branded credit cards issued, a value of authorized purchase made with the co-branded credit cards, an amount of interchange fees received, a number of applications for private label credit cards received, a number of private label credit cards issued, a value of authorized purchase made with the private label credit card at standard terms, a value of authorized purchase made with the private label credit card at promotional terms;

in a single electronic transaction, issuing a credit to the merchant for a positive account balance, and debiting the merchant for a negative account balance.

45. The method of claim 1, wherein the step determining an account balance for the merchant based on the first information, the second information, the at least one merchant compensation term, and the at least one issuer compensation term results in one of a credit or debit to the merchant's account.

46. The method of claim 1, wherein the combined reconciliation takes place on a regional basis.

* * * * *